United States Patent
Ghadar et al.

(10) Patent No.: US 10,571,595 B2
(45) Date of Patent: Feb. 25, 2020

(54) WORKFLOW FOR NAVIGATION WITH RESPECT TO OIL-WATER CONTACT USING DEEP DIRECTIONAL RESISTIVITY MEASUREMENTS

(71) Applicant: Schlumberger Technology Corporation, Sugar Land, TX (US)

(72) Inventors: Shabnam Ghadar, Medford, MA (US); Dzevat Omeragic, Lexington, MA (US); Christophe Dupuis, Tananger (NO); Michael Thiel, Cambridge, MA (US); Yong-Hua Chen, Belmont, MA (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/114,323

(22) PCT Filed: Jan. 27, 2015

(86) PCT No.: PCT/US2015/013145
§ 371 (c)(1),
(2) Date: Jul. 26, 2016

(87) PCT Pub. No.: WO2015/113067
PCT Pub. Date: Jul. 30, 2015

(65) Prior Publication Data
US 2017/0242147 A1    Aug. 24, 2017

Related U.S. Application Data

(60) Provisional application No. 61/932,052, filed on Jan. 27, 2014.

(51) Int. Cl.
*G01V 3/38* (2006.01)
*G01V 3/20* (2006.01)

(52) U.S. Cl.
CPC . *G01V 3/38* (2013.01); *G01V 3/20* (2013.01)

(58) Field of Classification Search
CPC .................................. G01V 3/38; G01V 3/20
See application file for complete search history.

(56) References Cited

U.S. PATENT DOCUMENTS 5,495,174 A * 2/1996 Rao ......................... E21B 7/046
175/45
6,163,155 A   12/2000 Bittar
(Continued)

FOREIGN PATENT DOCUMENTS

WO    2009079355 A1    6/2009

OTHER PUBLICATIONS

Near Surface Geophysics, 3 (2) (2005), pp. 71-78.*
(Continued)

*Primary Examiner* — Jarrett J Stark

(57) ABSTRACT

Methods for determining oil-water contact positions and water zone resistivities are provided. In one example, the method may involve performing a 1D inversion on data collected by a resistivity logging tool. Further, the method may involve scanning a resistivity profile of a reservoir generated by the 1D inversion for a boundary position below the resistivity logging tool. Furthermore, the method may involve applying a local residual weighted average on the boundary position to generate an initial estimation of an oil-water contact position and inverting the initial estimation of the oil-water contact to generate water zone resistivity and a modified oil-water contact position. Additionally, the method may involve running a smoothing local post-pro-
(Continued)

cessing operation to generate a layered model and performing a 2D inversion on the layered model.

8 Claims, 20 Drawing Sheets

(56) References Cited

U.S. PATENT DOCUMENTS

| | | | |
|---|---|---|---|
| 6,366,087 B1* | 4/2002 | Coates | G01N 24/081 324/300 |
| 6,464,021 B1* | 10/2002 | Edwards | E21B 7/06 166/250.07 |
| 6,594,584 B1 | 7/2003 | Omeragic et al. | |
| 6,911,824 B2 | 6/2005 | Bittar | |
| 6,998,844 B2 | 2/2006 | Omeragic et al. | |
| 7,366,616 B2 | 4/2008 | Bennett et al. | |
| 7,640,110 B2 | 12/2009 | Abubakar et al. | |
| 8,433,518 B2 | 4/2013 | Omeragic et al. | |
| 2004/0154831 A1 | 8/2004 | Seydoux et al. | |
| 2004/0245016 A1* | 12/2004 | Chemali | E21B 44/00 175/25 |
| 2005/0278121 A1* | 12/2005 | Tabarovsky | E21B 47/10 702/9 |
| 2005/0278122 A1* | 12/2005 | Tabarovsky | G01V 3/28 702/9 |
| 2006/0017442 A1* | 1/2006 | Folberth | G01V 3/30 324/334 |
| 2006/0017443 A1* | 1/2006 | Folberth | G01V 3/30 324/338 |
| 2006/0125479 A1* | 6/2006 | Chemali | E21B 47/022 324/339 |
| 2006/0155471 A1* | 7/2006 | Tabarovsky | G01V 3/28 702/6 |
| 2006/0192560 A1* | 8/2006 | Eiane | G01V 3/28 324/337 |
| 2006/0213669 A1* | 9/2006 | Shipley | E21B 41/0085 166/381 |
| 2006/0255810 A1* | 11/2006 | Yu | E21B 47/024 324/338 |
| 2010/0185393 A1 | 7/2010 | Liang et al. | |
| 2010/0332198 A1 | 12/2010 | Wharmund et al. | |
| 2011/0106514 A1* | 5/2011 | Omeragic | G01V 11/00 703/10 |
| 2012/0080197 A1 | 4/2012 | Dickens et al. | |
| 2014/0350859 A1 | 11/2014 | Lin et al. | |
| 2016/0245952 A1 | 8/2016 | Dupuis et al. | |
| 2017/0075021 A1 | 3/2017 | Thiel et al. | |
| 2017/0242147 A1* | 8/2017 | Ghadar | G01V 3/38 |
| 2017/0306746 A1* | 10/2017 | San Martin | G01V 3/20 |

OTHER PUBLICATIONS

International Preliminary Report on Patentability issued in related PCT applicationPCT/US2015/013145 dated Aug. 11, 2016, 6 pages.
International Search Report and Written Opinion issued in related PCT application PCT/US2015/013145, dated May 7, 2015, 9 pages.
Li et al, "New Directional Electromagnetic Tool for Proactive Geosteering and Accurate Formation Evaluation while Drilling," Society of Petrophysicists and Well Log Analysts, Jun. 26-29, 2005, 16 pages, SPWlA 46th Annual Logging Symposium held in New Orleans, Louisiana, USA.
Omeragic et al, "Deep Directional Electromagnetic Measurements for Optimal Well Placement," Society of Petroleum Engineers, SPE 97405, Oct. 9-15, 2005, 12 pages, 2005 SPE Annual Technical Conference and Exhibition, Dallas, Texas.
Omeragic et al, "Real-Time Interpretation of Formation Structure from Directional EM Measurements," Society of Petrophysicists and Well Log Analysts, Jun. 4-7, 2006, 14 pages, SPWLA 47th Annual Logging Symposium held in Veracruz, Mexico.
Dupuis et al, "Workflow to Image Unconformities with Deep Electromagnetic LWD Measurements Enables Well Placement in Complex Scenarios," Society of Petroleum Engineers, SPE 166117, Sep. 30, 2013-Oct. 2, 2013, SPE Annual Technical Conference and Exhibition held in New Orleans, Louisiana, USA.
Extended Search and Examination Report R. 62 issued in European patent application 15740854.3 dated Sep. 6, 2017, 7 pages.
Wisen et al., Combination of 1D laterally constrained inversion and 2D smooth inversion of resistivity data with a priori data from boreholes, Near Surface Geophysics, vol. 3, No. 17, May 1, 2005, pp. 71-79.
Abubakar et al., A Three-dimensional Parametric Inversion of Multi-component Multi-spacing Induction Logging Data. Society of Exploration Geophysicists, 2004 SEG Annual Meeting, Oct. 10-15, 2004. Denver, Colorado, USA. pp. 616-619.
Abubakar et al., A 3D parametric inversion algorithm for triaxial induction data, Geophysics, vol. 71, No. 1, Jan. 2006, pp. G1-G9.

* cited by examiner

WORKFLOW FOR NAVIGATION WITH RESPECT TO OIL-WATER CONTACT USING DEEP DIRECTIONAL RESISTIVITY MEASUREMENTS

CROSS-REFERENCE TO RELATED APPLICATIONS

This non-provisional patent application claims the benefit of and priority to U.S. Provisional Ser. No. 61/932,052, "Workflow for Navigation with Respect to Oil-Water Contact Using Deep Directional Resistivity Measurements," filed on Jan. 27, 2014, which is incorporated by reference in its entirety for all purposes.

TECHNICAL FIELD

This disclosure relates to inversion of data generated during well-logging.

BACKGROUND

Deep directional electromagnetic logging-while-drilling technology is an enabler of proactive well placement, relying on directional sensitivity measurements and real-time interpretation based on 1D multi-layer model-based inversion, integrated with geological modeling software. New generation of deep directional resistivity tools with reservoir scale measurements enable detection of boundaries and contacts up to 100 feet away from a wellbore, which enables reservoir imaging and optimization of well placement. Hundreds of wells have been drilled using this new technology, some of them in complex geological scenarios, where 1D assumption about the model may not provide enough information and may affect the quality of real-time interpretation.

Over the past decade, much progress has been made in interpretation of deep directional electromagnetic (EM) measurements using 1D multi-layer inversion. As the wells are being placed in more complex scenarios, these models may not be adequate. Placing the well with respect to oil-water contact (OWC) is one application of deep directional well placement technology. In cases where formation layers are dipping, the 1D assumption about the formation breaks down, and a standard inversion-based answer product may not take into account that the tool is close to the OWC and that the OWC may be flat and less conductive than the reservoir.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method involves performing a 1D inversion on data collected by a resistivity logging tool. Further, the method involves scanning a resistivity profile of a reservoir generated by the 1D inversion for a boundary position below the resistivity logging tool. Furthermore, the method involves applying a local residual weighted average on the boundary position to generate an initial estimation of an oil-water contact position and inverting the initial estimation of the oil-water contact to generate water zone resistivity and a modified oil-water contact position. Additionally, the method involves running a smoothing local post-processing operation to generate a layered model and performing a 2D inversion on the layered model.

In another example, a tangible, non-transitory, machine-readable medium may include processor-executable instructions to perform a 1D inversion on data collected by a resistivity logging tool. Further, the medium may include instructions to scan a resistivity profile generated by the 1D inversion for a boundary position below the resistivity logging tool and apply a local residual weighted average on the boundary position to generate an initial estimation of an oil-water contact. Furthermore, the medium may include instructions to invert the initial estimation of the oil-water contact to generate water zone resistivity and a modified oil-water contact position. Additionally, the medium may include instructions to run a smoothing local post-processing operation to generate a layered model and perform a 2D inversion on the layered model.

In another example, a method involves performing a three-layer model-based 1D inversion on data collected by a resistivity logging tool to determine reservoir layering and dip. Further, the method involves performing an inversion of deep directional and resistivity measurements from a 1D inversion to generate an oil-water contact position and a water zone resistivity and performing a 2D inversion on the layered models.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Hundreds of wells have been drilled using deep directional resistivity measurement (DDR) technology, some of them in complex geological scenarios, where a 1D assumption about the model may not provide enough information and may affect the quality of real-time interpretation. Real-time decision making in such conditions may be based on advanced answer products which use 1D-3D modeling and inversion. Specialized workflows provided below are intended to address specific complex non-1D scenarios. The workflows use a sequence of inversion steps to build the model complexity gradually from shallow to deep. Choice of measurement channels used in each individual step is based on the knowledge of measurement sensitivities. The choice of measurement channels may stabilize the workflow and reduce ambiguity in interpretation, therefore maximizing the measurement value.

Figure 1:
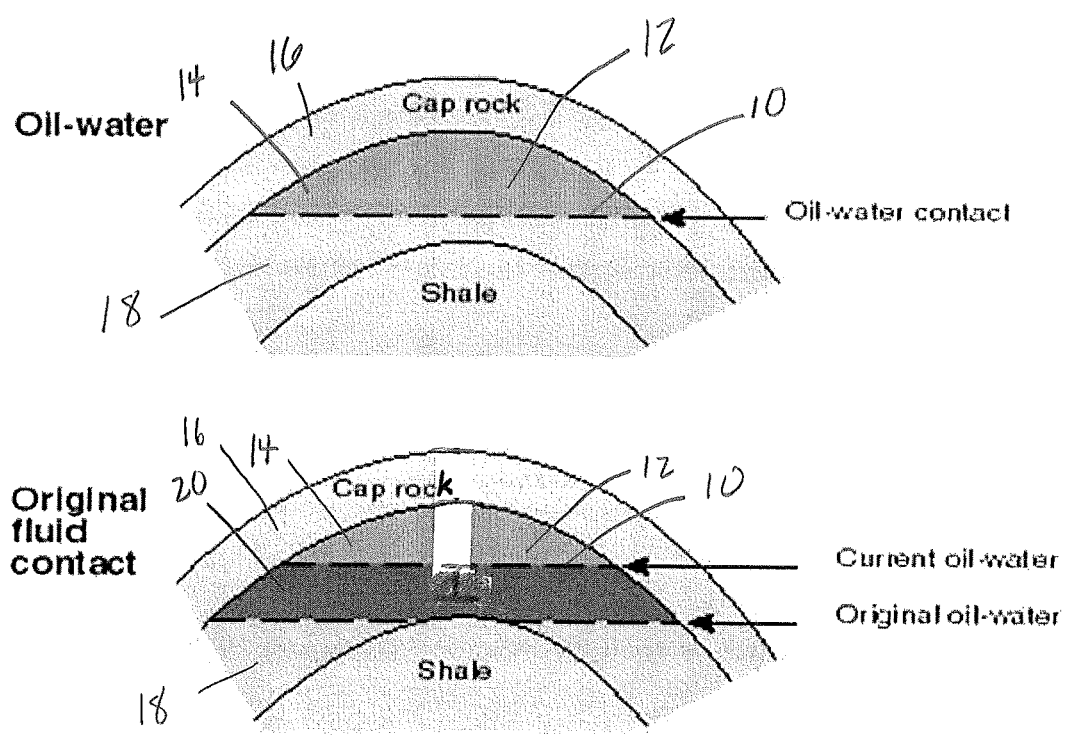
FIG. 1 is a block diagram of two reservoirs including oil-water contacts (OWCs), in accordance with an embodiment.

Oil-Water contact (OWC) is a term used to describe a bounding surface in a reservoir above which predominantly oil occurs and below which predominantly water occurs. An example of an OWC 10 in a reservoir 12 is shown in FIG. 1. In an oil or gas field, hydrocarbons 14 migrate into rocks and can be trapped if there is a permeability barrier 16 (i.e., a cap rock 16) to prevent upward escape. The hydrocarbons 14 are lighter than water 18, so the gas and oil form a bubble at a high end of a "trap" formed by the permeability barrier 16. Although oil and water are immiscible, the contact between oil and water may be a transition zone 20 and there may be irreducible water adsorbed by the grains in the rock and immovable oil that cannot be produced. In most cases, the OWC 10 is a flat horizontal, however, in poorly porous intervals, the OWC 10 could be irregular. Various embodiments of this disclosure are directed to analysis of flat OWC 10, globally or locally.

As can be seen from FIG. 1, modeling the OWC 10 is generally non-1D. For most cases, a 2D model is sufficient to represent the OWC 10 with the reservoir 12 formation above the OWC 10. Therefore, to characterize the OWC 10, one could directly apply a 2D inversion and obtain the 2D model based on the available measurements. However, the direct use of 2D inversion is not likely to work well due to undetermined nature of the modeling (there are several models that fit the data equally well). Moreover, 2D inversion generally uses more complex models which make it significantly computationally expensive. A more practical approach is to use a workflow where a 1D model is built with available data and used as an initial guess for the 2D inversion. This disclosure discusses a multi-step workflow to build a reliable 1D model.

Following the recent development of an application driven workflow for advanced well placement with respect to unconformity, this disclosure is directed to a new multi-step workflow to determine OWC position in a dipping formation using deep directional resistivity measurements. These resistivity measurements may be obtained from a resistivity logging tool, such as PERISCOPE™ developed by Schlumberger of Sugar Land, Tex. Resistivity logging tools are further described in, for example, U.S. Pat. No. 6,998,844, issued on Feb. 14, 2006. Also, resistivity logging tools and related processing is described in for example, U.S. Pat. No. 8,433,518, issued on Apr. 30, 2013. Both of these patents are hereby incorporated by reference their entireties for all purposes.

OWC Sensitivity

Figure 2A:
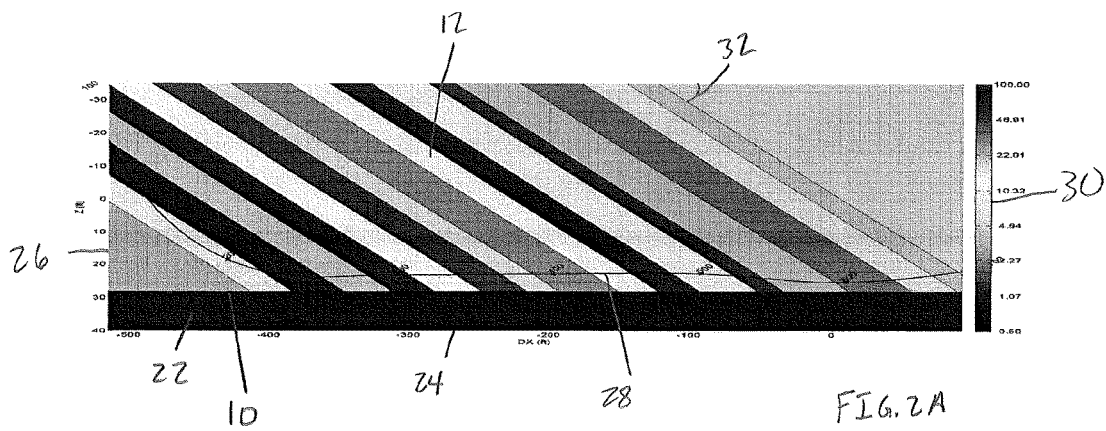
FIG. 2A is a graph of a synthetic formation representing a layered reservoir with an OWC, in accordance with an embodiment.

Initially, a measurement sensitivity analysis is performed on synthetic models. The base case model we used is shown in FIG. 2A where a homogenous water zone 22 of resistivity 0.9 Ωm is in the bottom of the reservoir 12, below a 28 ft. true vertical distance (TVD). An x-axis 24 represents a horizontal distance in feet, and a y-axis 26 represents the TVD in feet. A wellbore 28, represented by a solid black line, has a distance to OWC that varies between 5 ft and 7 ft. A resistivity of the reservoir 28 is between 3.5 Ωm and 90 Ωm, the layer thickness (TSD) is between 5 ft and 10 ft, and the dip 32 of internal layering is 15°. A resistivity key 30 provides an indication of the resistivities of the layers and the homogenous water zone 22 within the reservoir 12.

Figure 2B:
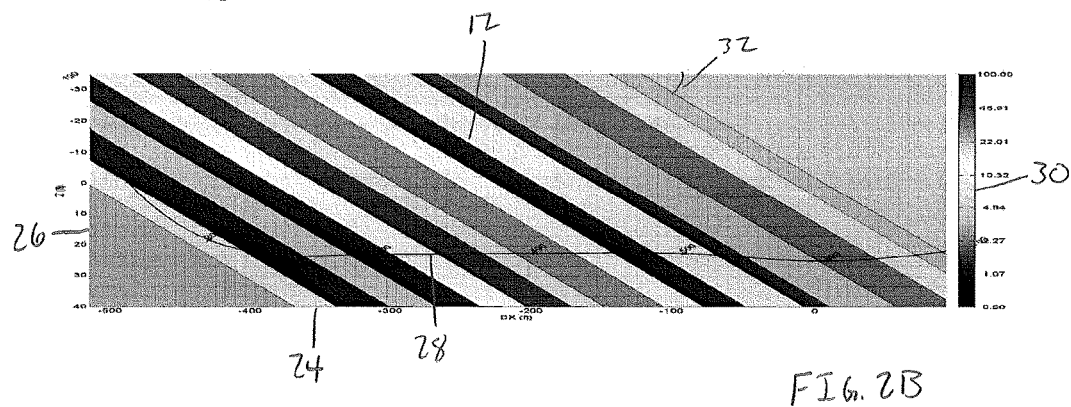
FIG. 2B is a graph of a synthetic formation representing the layered reservoir of FIG. 2B without an OWC, in accordance with an embodiment.

To better understand the sensitivity of the logs to water, FIG. 2B provides a model with a similar reservoir 12 formation to the reservoir 12 formation of FIG. 2A without the presence of the OWC 10. Computed responses between the reservoirs 12 in FIGS. 2A and 2B may illustrate a sensitivity of the resistivity logging tool to the presence of the OWC 10. Deeper measurement channels may be more sensitive than the responses of shallower measurement channels, as can be observed below in FIG. 3.

Figure 3A:
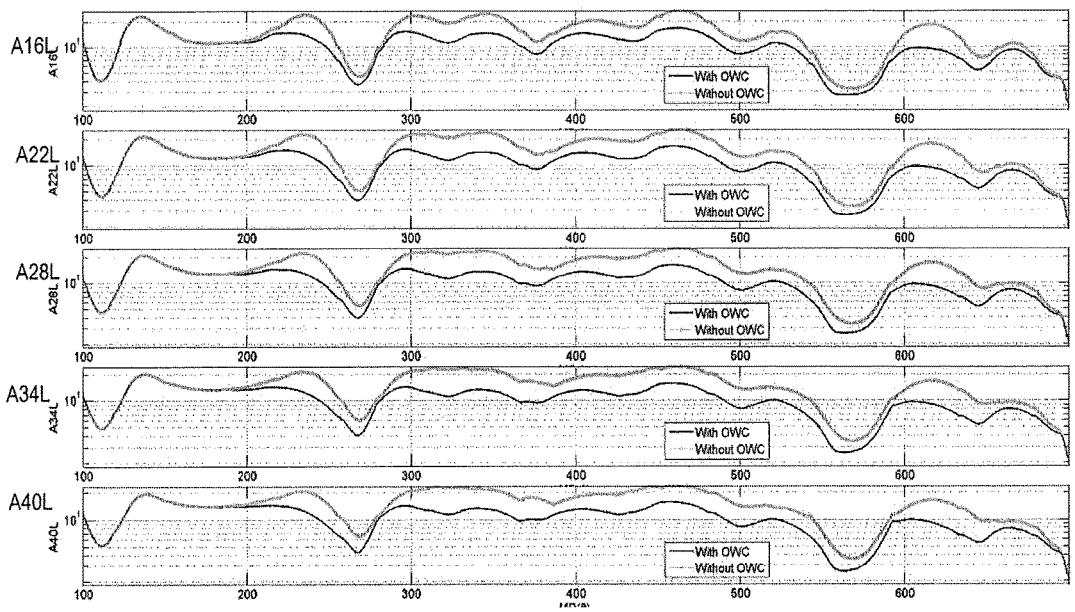
FIG. 3A is a graph of low frequency attenuation apparent frequencies of the synthetic formation of FIGS. 2A and 2B, in accordance with an embodiment.
Figure 3B:
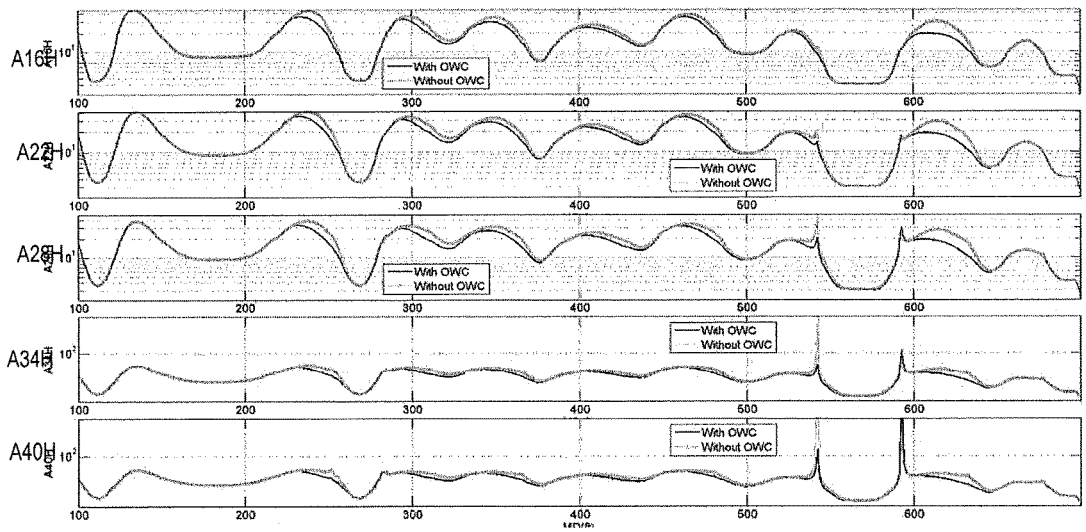
FIG. 3B is a graph of high frequency attenuation apparent frequencies of the synthetic formation of FIGS. 2A and 2B, in accordance with an embodiment.
Figure 3C:
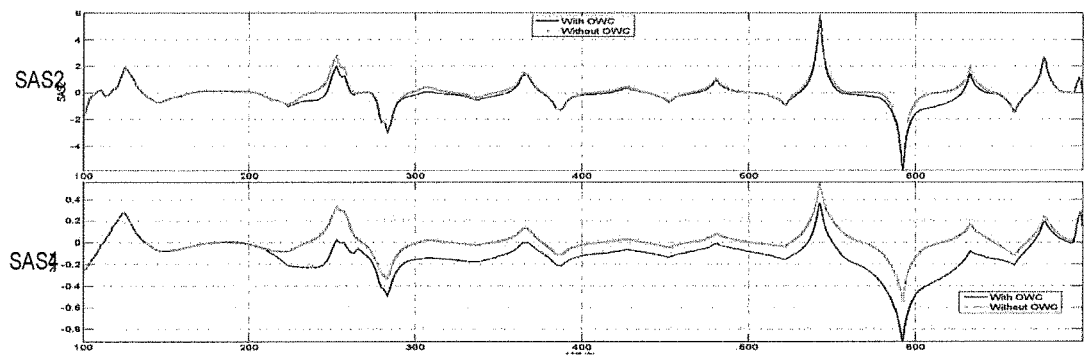
FIG. 3C is a graph of short spacing symmetrized directional attenuation responses of the synthetic formation of FIGS. 2A and 2B, in accordance with an embodiment.
Figure 3D:
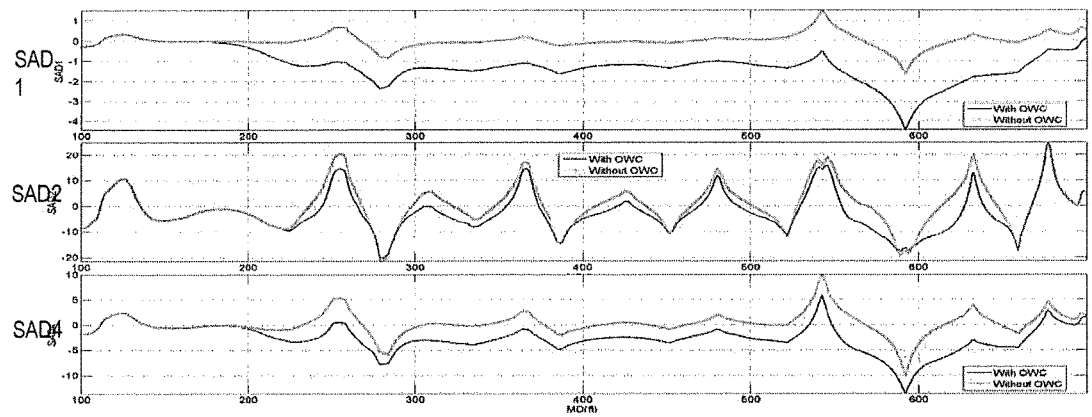
FIG. 3D is a graph of deep symmetrized directional attenuation responses of the synthetic formation of FIGS. 2A and 2B, in accordance with an embodiment.
Figure 3E:
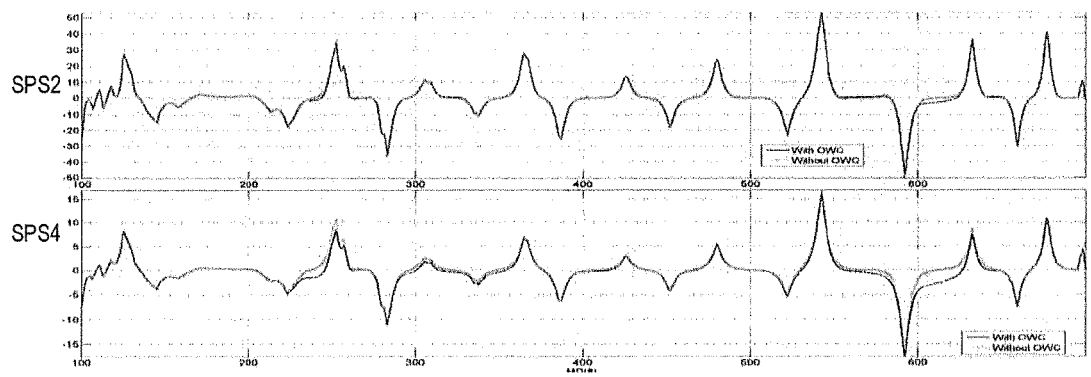
FIG. 3E is a graph of short spacing symmetrized directional phase shift responses of the synthetic formation of FIGS. 2A and 2B, in accordance with an embodiment.
Figure 3F:
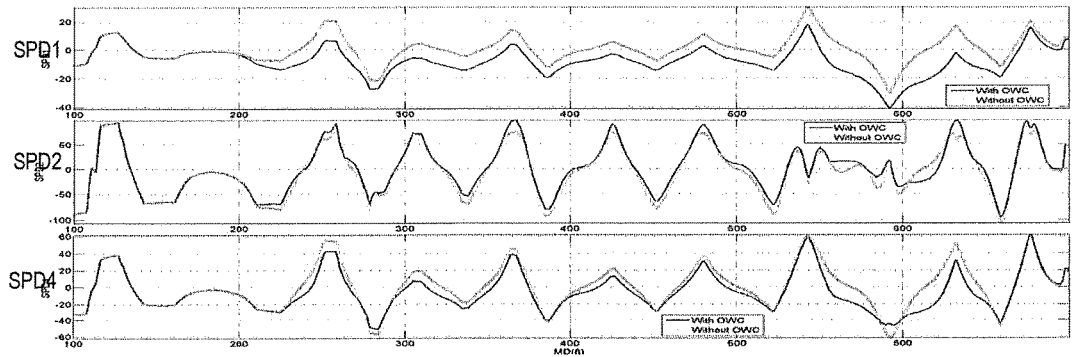
FIG. 3F is a graph of deep symmetrized directional phase shift responses of the synthetic formation of FIGS. 2A and 2B, in accordance with an embodiment.
Figure 3G:
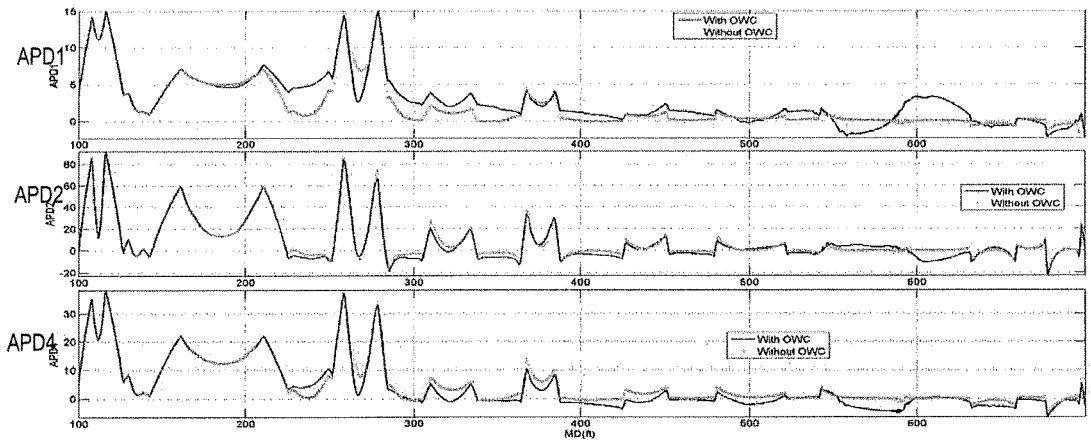
FIG. 3G is a graph of deep anti-symmetrized directional phase of the synthetic formation of FIGS. 2A and 2B, in accordance with an embodiment.
Figure 3H:
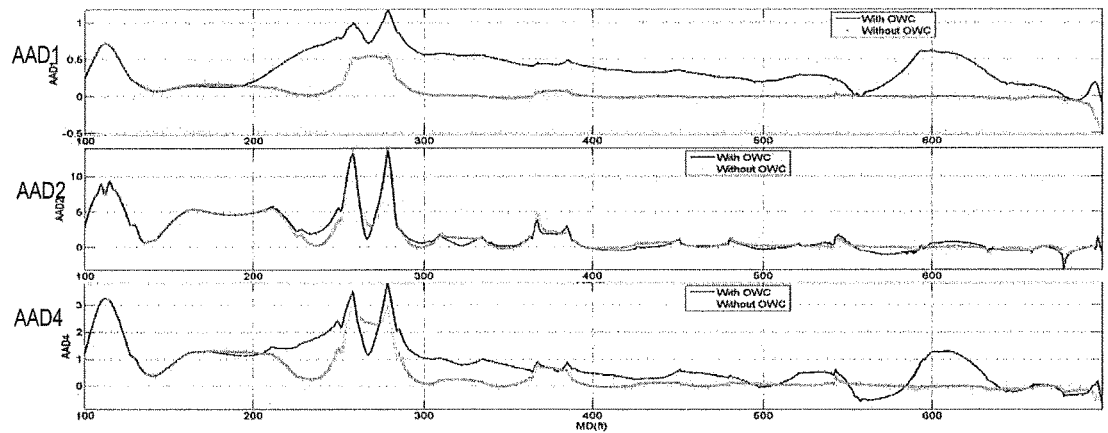
FIG. 3H is a graph of deep anti-symmetrized directional attenuation responses of the synthetic formation of FIGS. 2A and 2B, in accordance with an embodiment.

The resistivity logging tool responses to the reservoir 12 formations of FIGS. 2A and 2B, modeled using the 2.5D solver (WebMI H25D), are shown in FIGS. 3A-3H. The dark curves in FIGS. 3A-3H represent the response of the resistivity logging tool in the reservoir 12 with the OWC 10 (FIG. 2A), and the light curves in FIGS. 3A-3H represent the response of the resistivity logging tool in the reservoir 12 without the OWC 10 (FIG. 2B). For example, FIG. 3A represents low frequency attenuation apparent frequencies, FIG. 3B represents high frequency attenuation apparent frequencies, FIG. 3C represents short spacing symmetrized directional attenuation responses at 400 kHz and 2 MHz, FIG. 3D represents deep symmetrized directional attenuation responses at 100 kHz, 400 kHz, and 2 MHz, FIG. 3E represents short spacing symmetrized directional phase shift responses at 400 kHz and 2 MHz, FIG. 3F represents deep symmetrized directional phase shift responses at 100 kHz, 400 kHz, and 2 MHz, FIG. 3G represents deep anti-symmetrized directional phase shift responses at 100 kHz, 400 kHz, and 2 MHz, and FIG. 3H represents 1 deep anti-symmetrized directional attenuation responses at 100 kHz, 400 kHz, and 2 MHz. High frequency resistivity channels show minimal sensitivity to water, while deep directional channels, especially low frequency deep directional channels, such as SAD1, SAD4 and SPD1, show the most sensitivity. This may provide a road map for choosing appropriate channels in the inversion.

OWC Workflow

Figure 4:
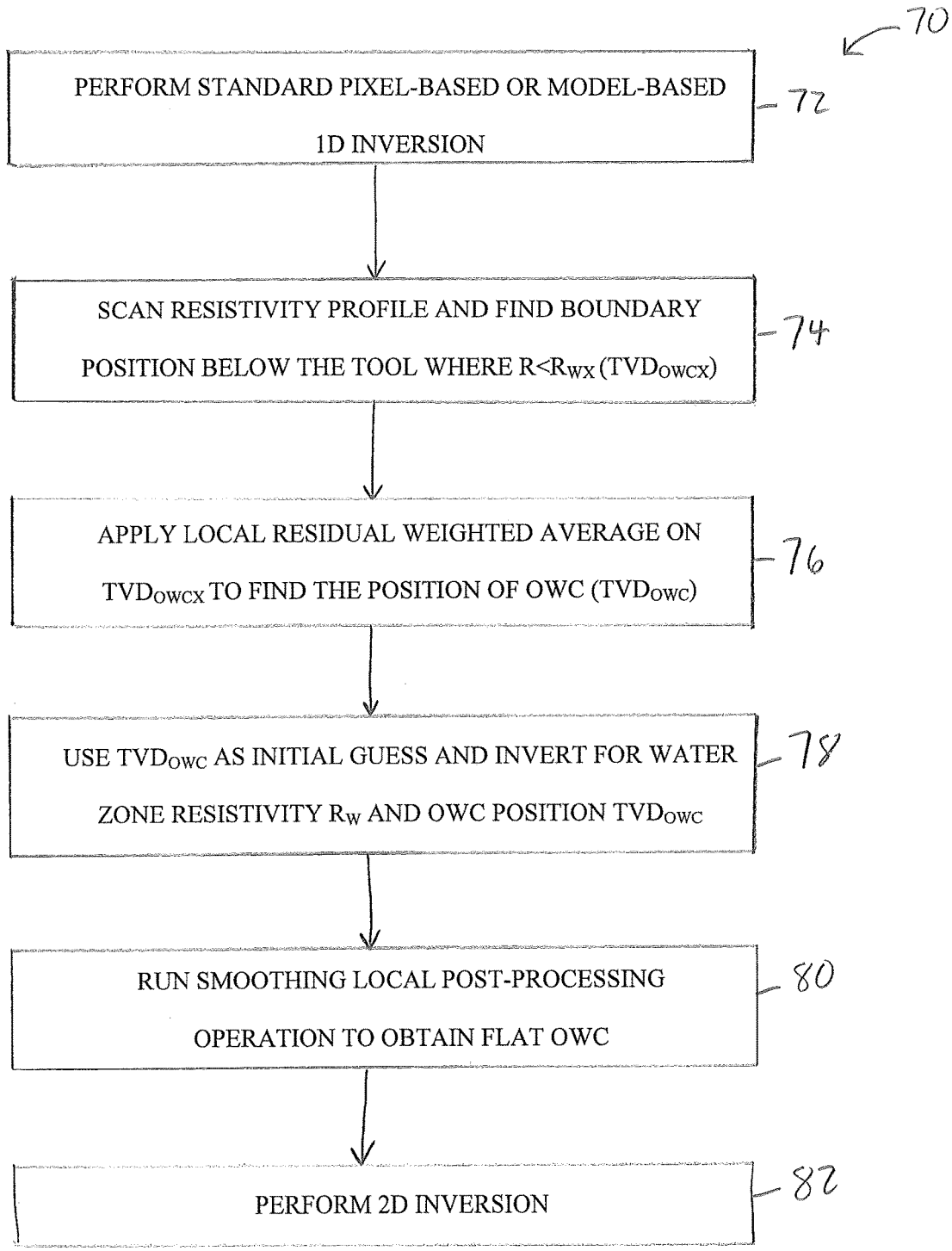
FIG. 4 is a flow chart of a workflow for obtaining a position of an OWC and a water zone resistivity, in accordance with an embodiment.

Based on the observations, above, FIG. 4 is a multi-step workflow 70 for providing a model of the OWC 10 depth and resistivity based on measurements from the resistivity logging tool. Initially, a standard pixel-based or model-based 1D inversion is performed on the data obtained from the resistivity logging tool (block 72). The 1D inversion may generate a resistivity profile of the reservoir 12 surrounding the wellbore 28.

Subsequently, the resistivity profile generated at block 72 is scanned for a boundary position below the resistivity logging tool where R is the resistivity indicated by the resistivity profile and $R_{wx}$ is the maximum resistivity of the water zone 22 (block 74). This boundary position may represent an initial estimate of the TVD of the OCW 10, and the initial estimate may be indicated as $TVD_{OWCX}$.

After scanning for the boundary position and determining $TVD_{OWCX}$, a local residual weighted average may be applied to $TVD_{OWCX}$ to find a more accurate position ($TVD_{OWC}$) of the OWC 10 (block 76). The $TVD_{OWC}$ may be used as an initial guess of the position of the OWC 10. Accordingly, the $TVD_{OWC}$ may be inverted to determine water zone resistivity $R_w$ (block 78).

Further, after inverting the $TVD_{OWC}$, a smoothing local post-processing operation may be performed on a model resulting from block 78 to flatten the OWC 10 (block 80), and a 2D inversion may be performed on a model resulting from block 80 when layers of the reservoir 12 are dipping (block 82).

SYNTHETIC EXAMPLES

Since, in many cases, there is not enough information about the location and resistivity of the water within the formation, block 72 of the workflow 70 is performed. It is worth mentioning that the 1D reservoir formation may be inverted in block 72, and in some embodiments not inverted in other blocks. Furthermore, block 72 should be accurate enough so that the existence of the water and its approximate location can be obtained. That is, a total number of layers inverted in the 1D model is sufficient to detect a presence and a location of the water zone 22 within the reservoir 12. To clarify this more, two standard model-based inversion results are illustrated in FIGS. 5A and 5B for the formation of FIG. 2A.

Figures 5A, 5B, 5C:
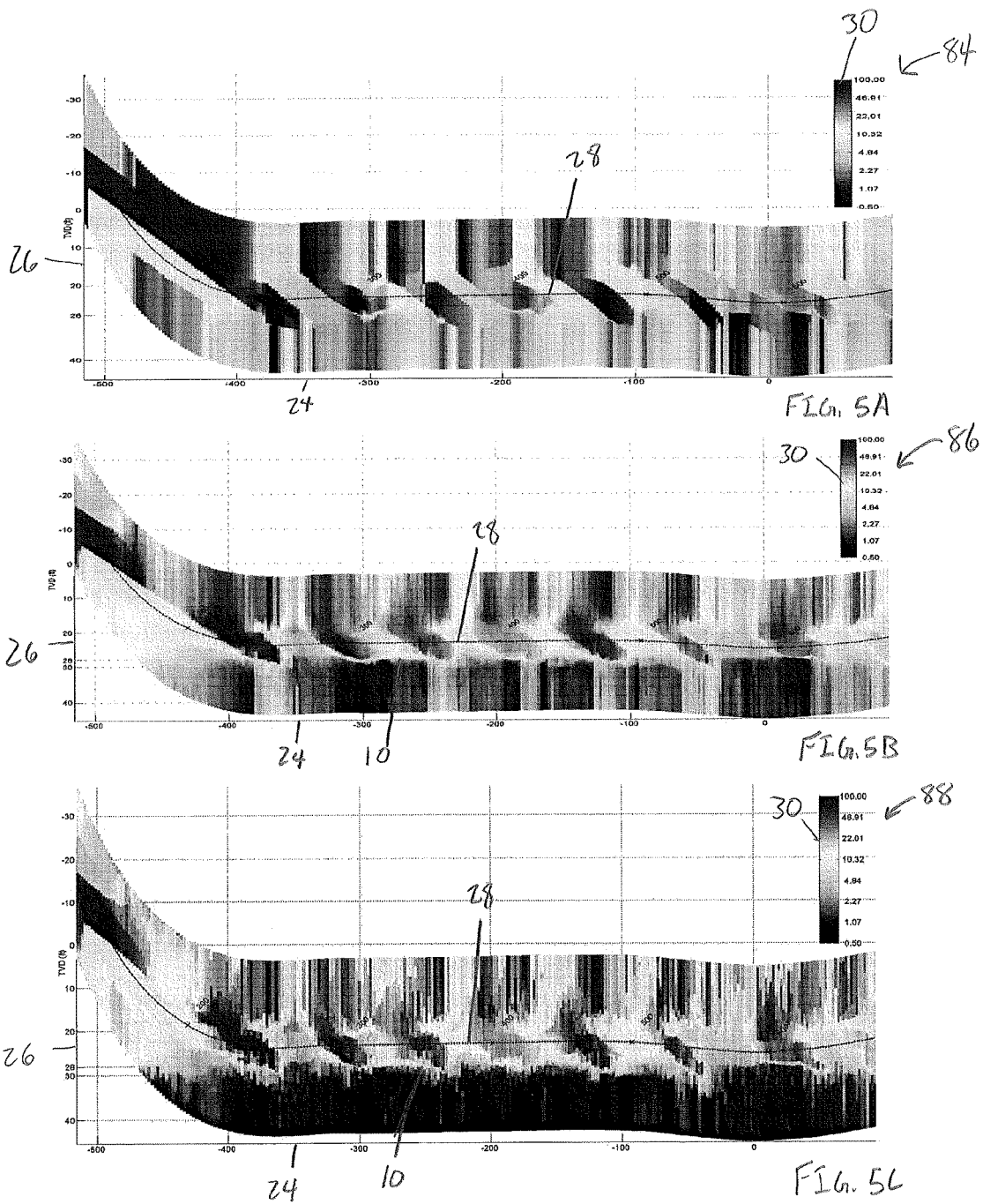
FIG. 5A is a graph of a standard 1D model-based inversion of the formation of FIG. 2A for up-to 3 layers of refinement, in accordance with an embodiment.
FIG. 5B is a graph of a standard 1D model-based inversion of the formation of FIG. 2A for up-to 5 layers of refinement, in accordance with an embodiment.
FIG. 5C is a graph of an inversion of the model of FIG. 5B, in accordance with an embodiment.

FIG. 5A illustrates a graph 84 for a standard 1D model-based inversion of the formation of FIG. 2A for up-to 3 layers of refinement. Additionally, FIG. 5B illustrates a graph 86 for a standard 1D model-based inversion of the formation of FIG. 2A for up-to 5 layers of refinement. In both cases a weighted residual average of the results is displayed.

Even though both inversions reconstruct the reservoir formation, the graph 84 does not reconstruct the OWC 10. However, the graph 86 provides an indication of the OWC 10 presence, and, therefore, the model-based inversion for up-to 5 layers may be more beneficial for an indication of the OWC 10 position than the model-based inversion for up-to 3 layers.

Accordingly, using the inversion results shown in the graph 86 as an initial guess, the block 78 of the workflow 70 is performed on the inversion of FIG. 5B to generate FIG. 5C. FIG. 5C illustrates a graph 88, which is an inversion of the model represented by the graph 86 to determine the water zone resistivity ($R_w$) and a clearer picture of the OWC 10 position ($TVD_{OWC}$).

Figure 6:
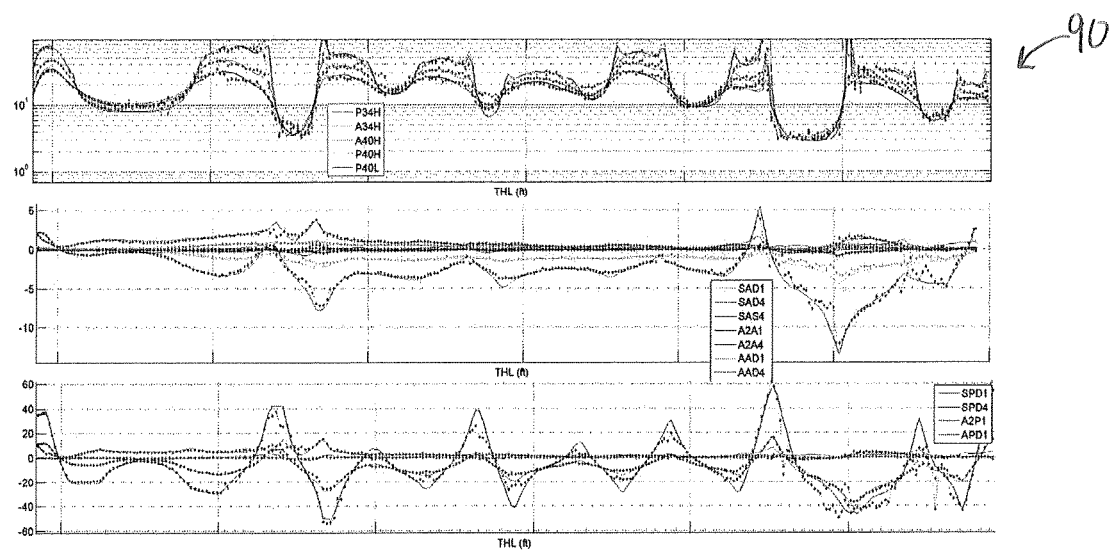
FIG. 6 is an a resistivity log reconstruction of various channel responses initially provided in FIGS. 3A-3H, in accordance with an embodiment.

Additionally, FIG. 6 represents a resistivity log reconstruction 90 of various channel responses initially provided in FIGS. 3A-3H of the resistivity logging tool. The dotted lines represent reconstructed channels based on the workflow 70, and the solid lines represent the measurement data, as provided in FIGS. 3A-3H. It is apparent that the reconstructed channels provide a fair representation of the original measurement data.

Figure 7:
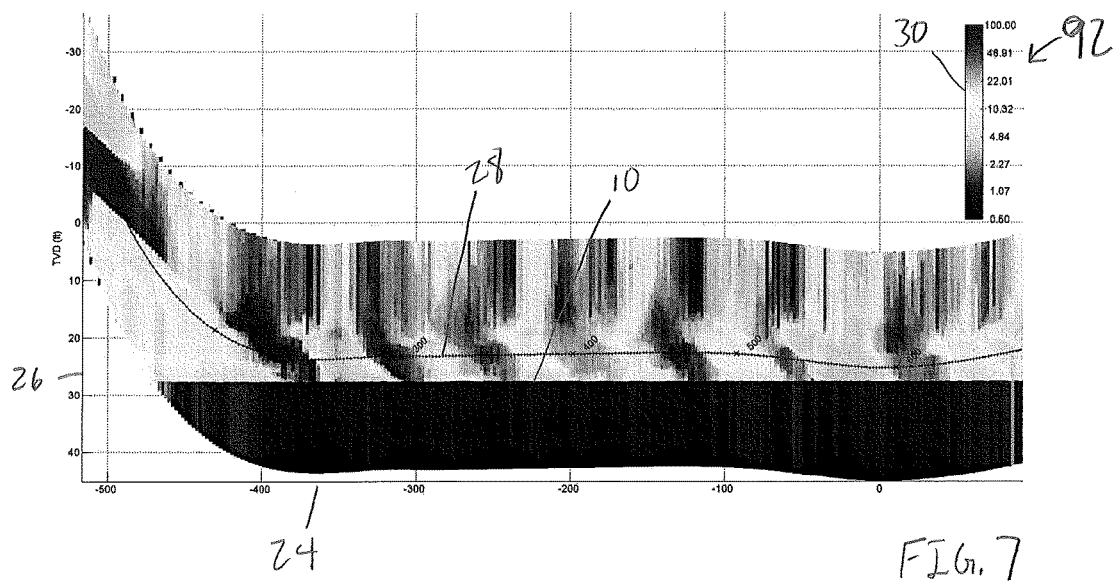
FIG. 7 is a graph showing the results after running the smoothing local post-processing operation on the model of the FIG. 5C, in accordance with an embodiment.

FIG. 7 provides an illustration of a graph 92 showing the results after running the smoothing local post-processing operation on the model of the graph 88, as provided by block 80 of the workflow 70. The graph 92 provides an indication of the OWC 10 at 27.68 ft., which is about 0.4 ft. higher than the original level. Additionally, the graph 92 provides an accurate representation of the water zone resistivity ($R_w$).

Figure 8:
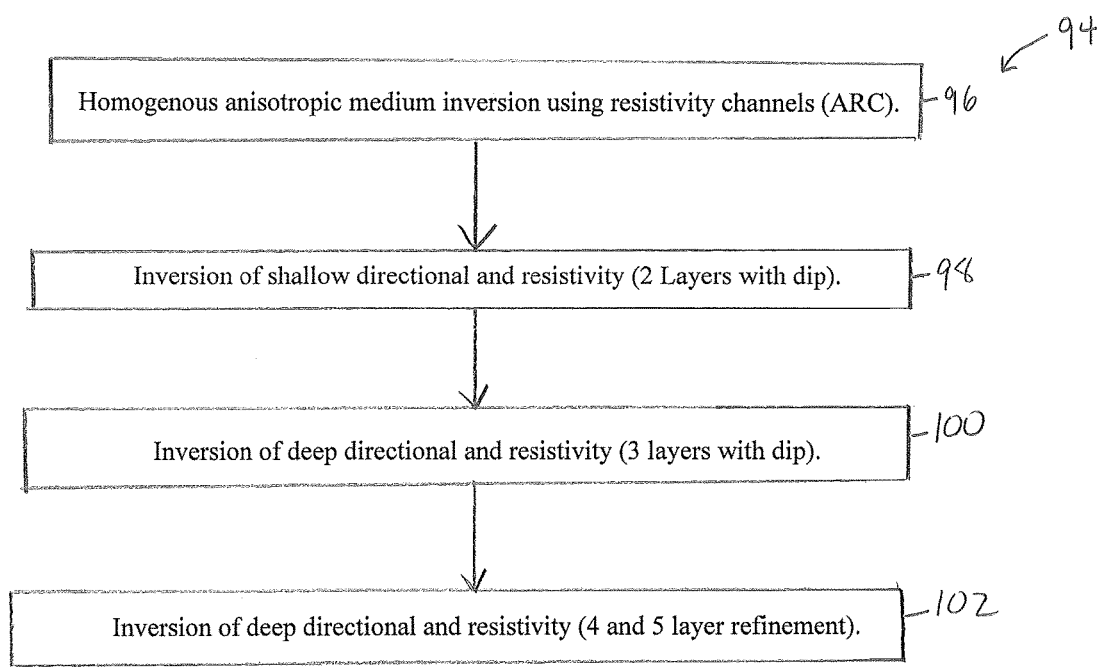
FIG. 8 is a flow chart of a workflow for building a standard model-based inversion for up to 5 layers, in accordance with an embodiment.

FIG. 8 is a workflow 94 for building a standard model-based inversion for up to 5 layers. Initially, a homogenous anisotropic medium inversion using resistivity channels is accomplished (block 96). This inversion represents the simplest complexity layer inversion of the workflow 94. Subsequently, an inversion of shallow directional and resistivity of 2 layers with a formation dip is accomplished (block 98). This layer of inversion represents the next complexity and provides some depth to the inversion of block 96. Next, an inversion of deep directional and resistivity of 3 layers with a formation dip is accomplished (block 100). Additionally, an inversion of deep directional and resistivity of 4 and 5 layer refinement may be accomplished (block 102). Accordingly, upon completing block 102, a standard model-based inversion for up to 5 layers is accomplished, which may provide sufficient information to determine the OWC 10 and the resistivity of the water zone 22.

Synthetic OWC—Changing the Reservoir Resistivity

Figure 9:
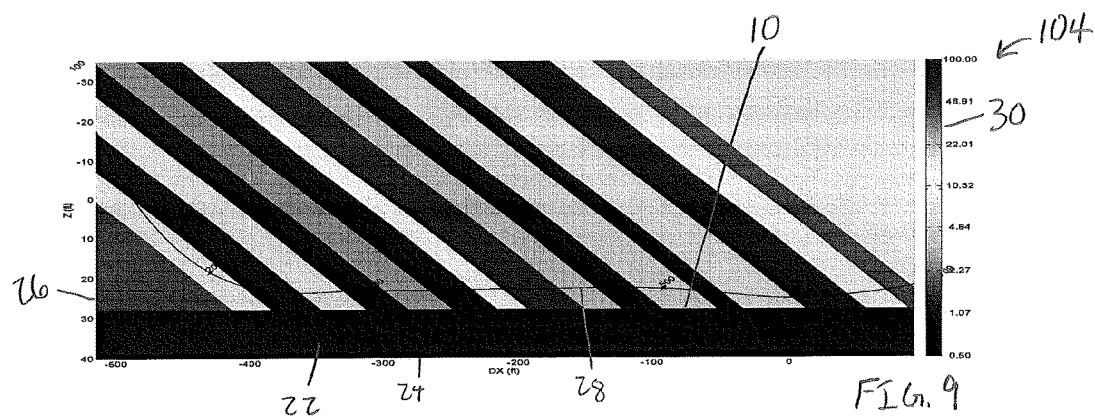
FIG. 9 is a graph of a synthetic formation representing a layered reservoir with an OWC, in accordance with an embodiment.

To test the workflow performance in more resistive formations, the original synthetic formation depicted in FIG. 2A is modified by multiplying layer resistivities by 2. The resulting formation is depicted by the graph 104 in FIG. 9. The water zone resistivity remains unchanged, thus the contrast between the layering and water is higher and expected to achieve a clear indication of the OWC 10.

Figure 10:
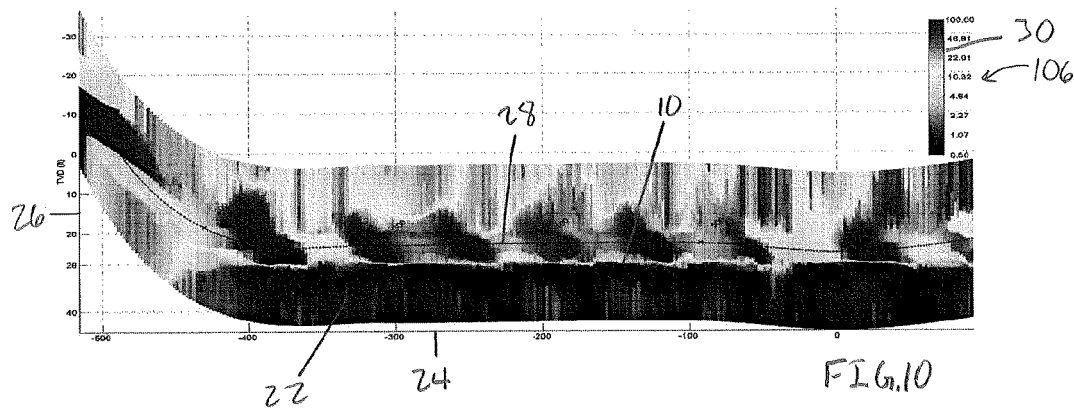
FIG. 10 is a graph representing a residual weighted average of a 1D inversion of the synthetic formation of FIG. 9, in accordance with an embodiment.
Figure 11A:
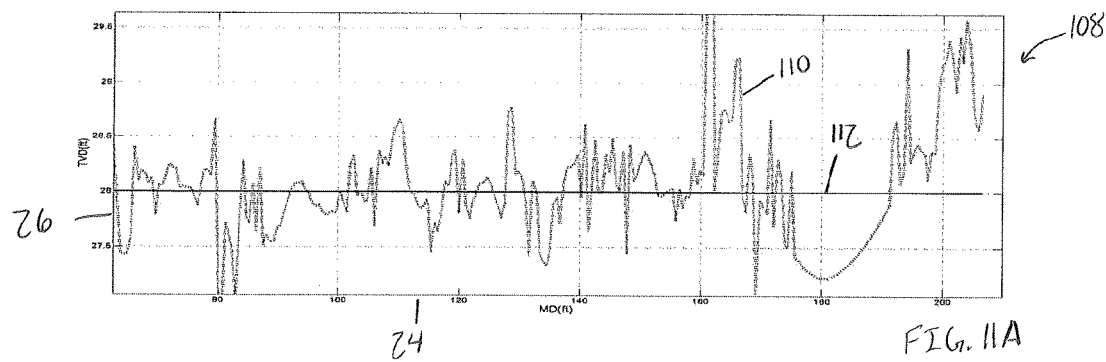
FIG. 11A is a graph of an inverted location of the OWC of FIG. 9 as compared to a known value of the OWC, in accordance with an embodiment.
Figure 11B:
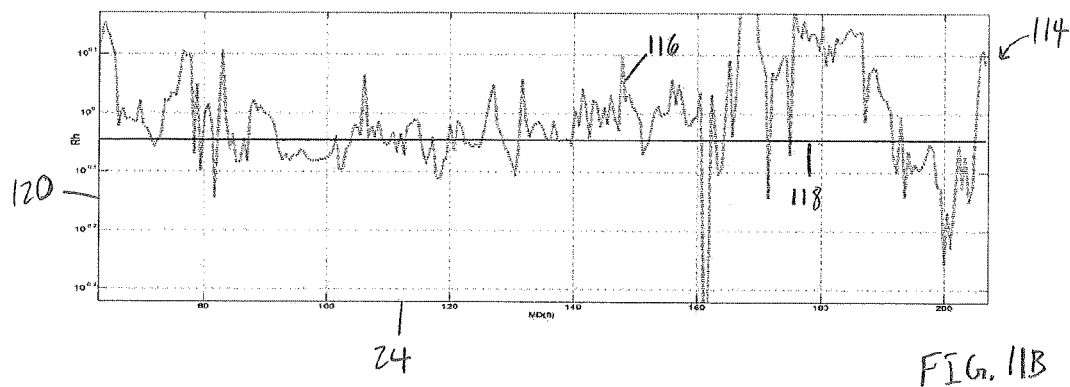
FIG. 11B is a graph of an inverted resistivity of a water zone of FIG. 9 as compared to a known resistivity of the water zone, in accordance with an embodiment.

Using the workflow 70 on measurements collected by the resistivity logging tool, FIG. 10 depicts a graph 106 representing the residual weighted average of the 1D inversion. Additionally, FIG. 11A shows an inverted location of the OWC 10 (line 110) as compared to a known value of the OWC 10 (line 112). Further, FIG. 11B depicts a graph 114 of an inverted resistivity of the water zone 22 (line 116) versus a known resistivity of the water zone 22 (line 118). The graph 114 is illustrated with the x-axis 24 representing the horizontal distance in feet and a y-axis 120 representing the inverted resistivity of the water zone 22. According to FIGS. 10 and 11, the estimated location of the OWC 10 is very close to the known value of the OWC 10 within the formation represented by the graph 104.

Figure 12:
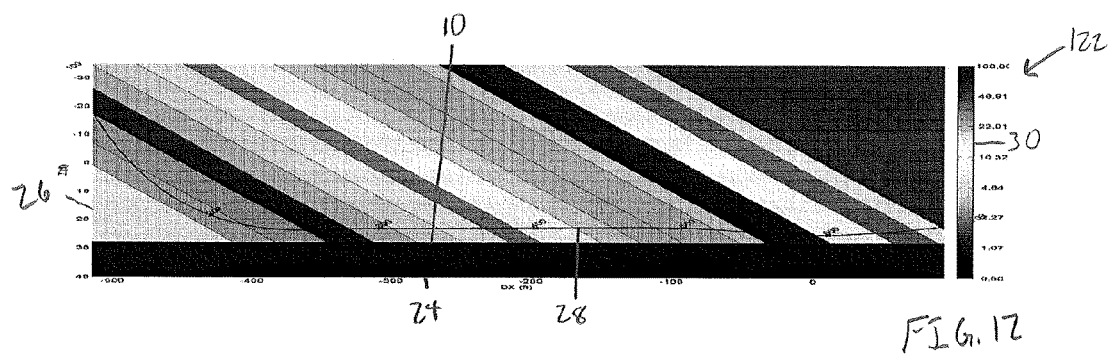
FIG. 12 is a graph of a synthetic formation representing a layered reservoir with an OWC, in accordance with an embodiment.
Figure 13A:
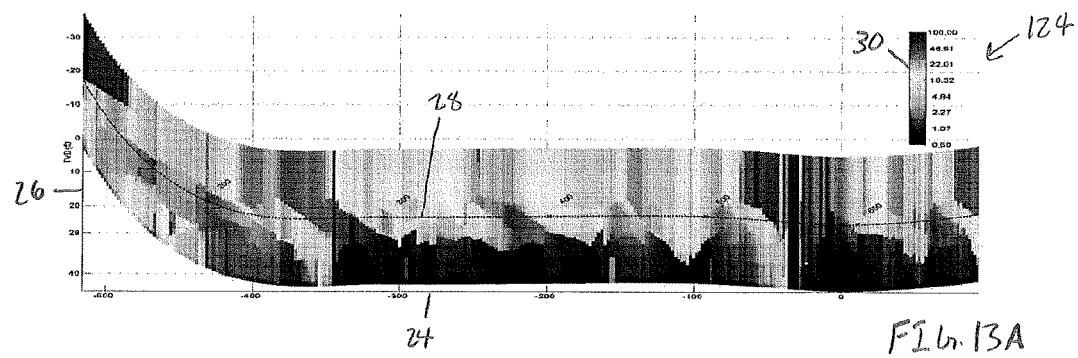
FIG. 13A is a graph representing a standard-pixel-based inversion of the synthetic formation of FIG. 12 using the workflow of FIG. 4, in accordance with an embodiment.
Figure 13B:
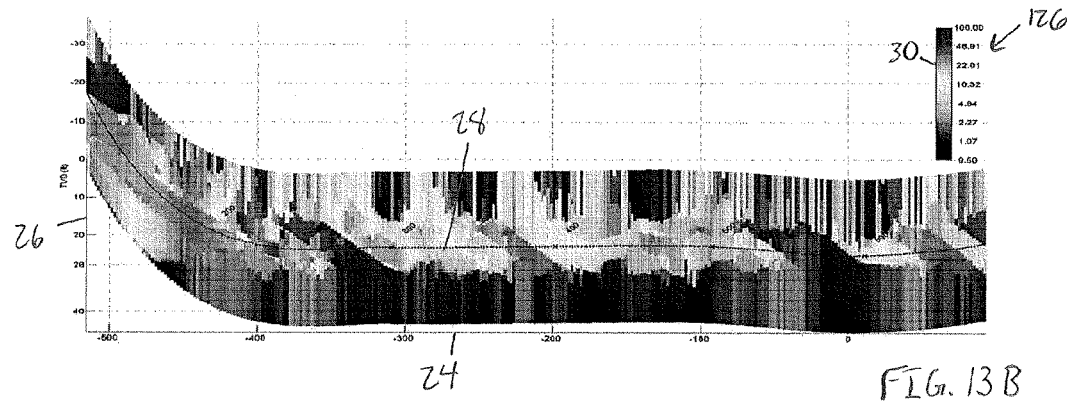
FIG. 13B is a graph representing a standard-model-based inversion of the synthetic formation of FIG. 12 using the workflow of FIG. 4, in accordance with an embodiment.

FIG. 12 provides a graph 122 that depicts a synthetic formation with a reduced contrast between the reservoir 12 formation and the water zone 22 by dividing formation layer resistivities by 3. Since the contrast is now reduced, and in some areas non-existent, the inversion is less helpful for determining the OWC 10 position. Results from the workflow 70 using both standard-pixel-based inversion and standard-model-based inversion are shown in graph 124 of FIG. 13A and graph 126 of FIG. 13B, respectively.

Figure 14:
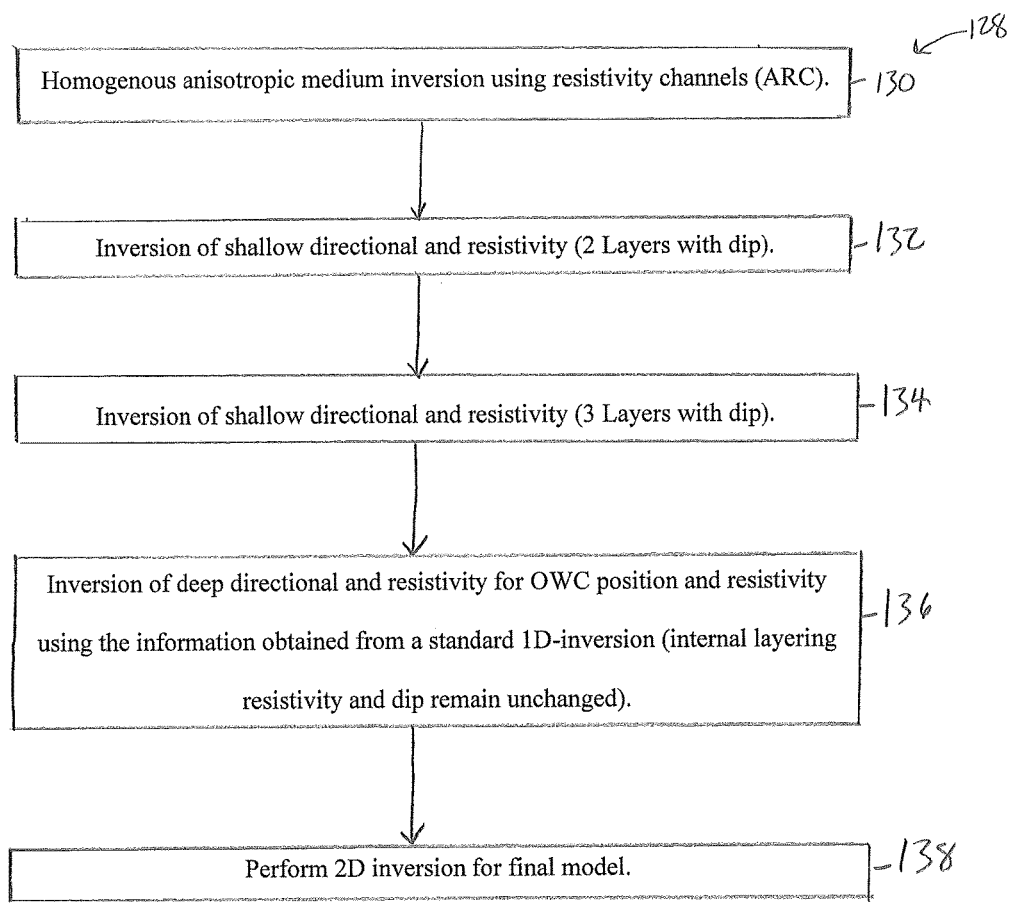
FIG. 14 is a flow chart of an alternate workflow for obtaining a position of an OWC and a water zone resistivity, in accordance with an embodiment.

Despite the inversions providing a good estimate for the OWC 10 position, it fails to accurately predict the water zone resistivity. Furthermore in the areas where the contrast between the reservoir 12 and water zone 22 is low, the inversion algorithm does not produce consistent results. To overcome inconsistencies in such scenarios, FIG. 14 provides a workflow 128. The work flow first deploys shallow measurements only for characterizing the near zone of the reservoir. Since shallow measurements are less affected by the OWC 10, they can better resolve for the internal layering. Then, deep measurements can be used to determine the position of the OWC 10 with the initial guess obtained from standard 1D real-time inversion.

It is worth highlighting that since blocks 130-134 represent a standard 3 layer inversion and are substantially similar to blocks 96-100 of FIG. 8. Subsequently, an inversion of deep directional and resistivity for the OWC 10 position and resistivity may be obtained from a standard 1D-inversion using the workflow 70 described above (block 136). Accordingly, information about the location and resistivity of the water used in block 136 of the workflow 128 has already been obtained. Lastly, a 2D inversion may be performed for the final model at block 138.

Figure 15A:
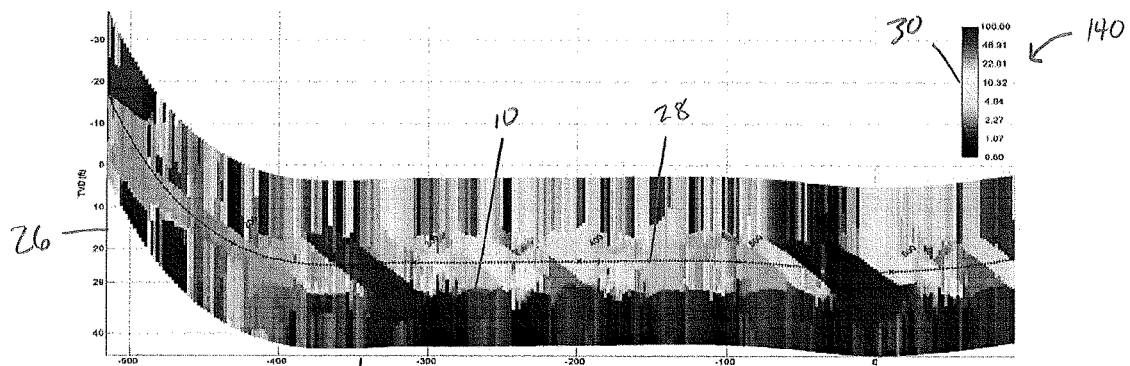
FIG. 15A is a graph of inversion results after a portion the workflow of FIG. 14 is applied to the formation of FIG. 12, in accordance with an embodiment.
Figure 15B:
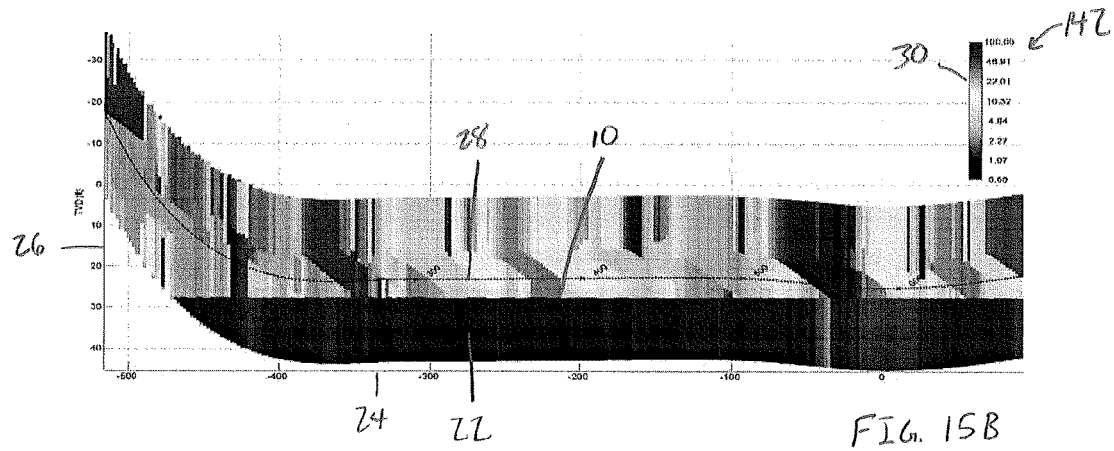
FIG. 15B is a graph representing results of a smoothing post-process operation after a portion of the workflow of FIG. 14 is applied to the formation of FIG. 12, in accordance with an embodiment.

The modified workflow was applied to the case of the graph 122 and the results are shown in FIGS. 15A and 15B. For example, FIG. 15A depicts a graph 140 representing the inversion results after block 136 of the workflow 128 is applied to the formation of the graph 122 in FIG. 12, and FIG. 15B depicts a graph 142 representing results of a smoothing post-process operation after block 138 of the workflow 128. Accordingly, the OWC 10 position and the resistivity of the water zone 22 are represented in the graph 142.

Sensitivity to Location of OWC

The effect of position of the OWC 10 can be investigated by moving it closer or further away from the trajectory. The expectation is that if the OWC 10 is within the depth of investigation of the resistivity logging tool, then it should be able to be resolved. If the OWC 10 is very close to the resistivity logging tool, all the measurements are affected by the low resistivity of the water and hence following the workflow 128 may provide improved results over the workflow 70.

Figure 16:
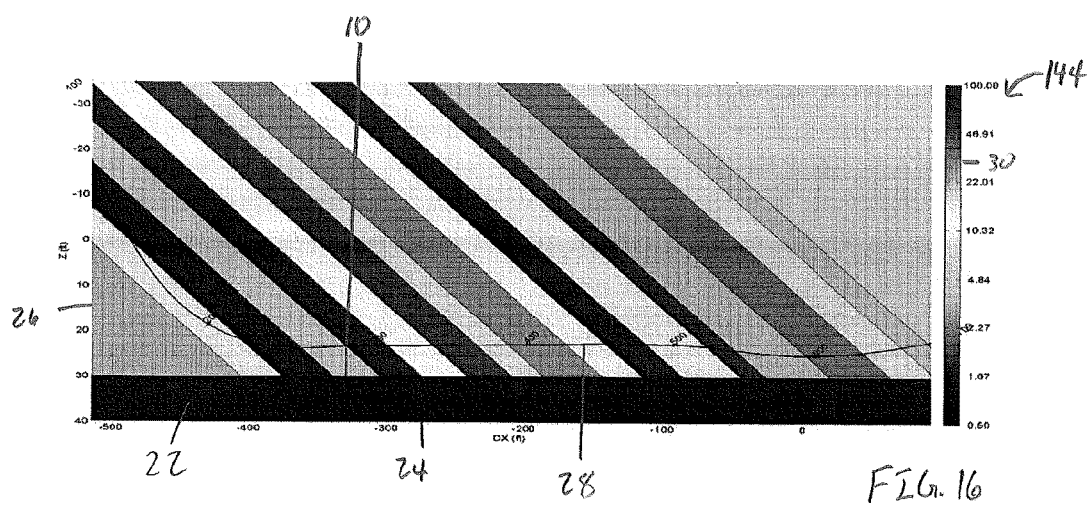
FIG. 16 is a graph of a synthetic formation representing a layered reservoir with an OWC, in accordance with an embodiment.

In FIG. 16, a graph 144 represents the synthesized formation from FIG. 2A with the OWC 10 moved 2 feet further away from the wellbore 28, namely $TVD_{OWC}$ is approximately 30 ft, making it about 7 feet to 10 feet away from the resistivity logging tool. Since this distance from the resistivity logging tool is still within a depth of investigation of the resistivity logging tool, the workflow should be able to resolve it.

Figure 17:
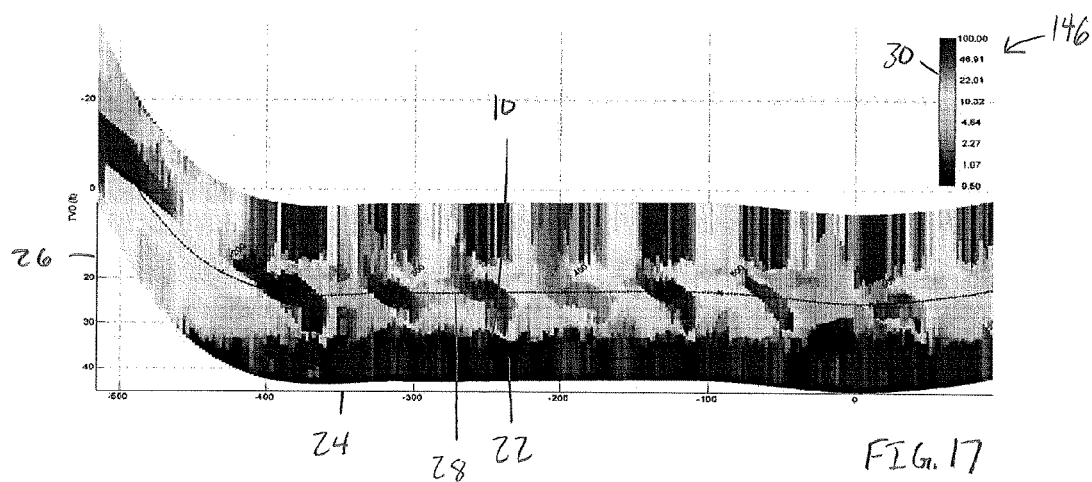
FIG. 17 is a graph of inversion results of the workflow of FIG. 4 applied to the synthetic formation of FIG. 16, in accordance with an embodiment.

In applying the workflow 70 to the synthesized formation of FIG. 16, FIG. 17 provides the inversion results confirming that the workflow 70 is capable of determining the OWC 10. Furthermore, if the water zone 22 is moved further away from the wellbore 28, the internal layering may be less affected by the water. Thus, the resolution of the internal layering may be greater than if the water zone 22 was closer to the wellbore 28.

Figure 18:
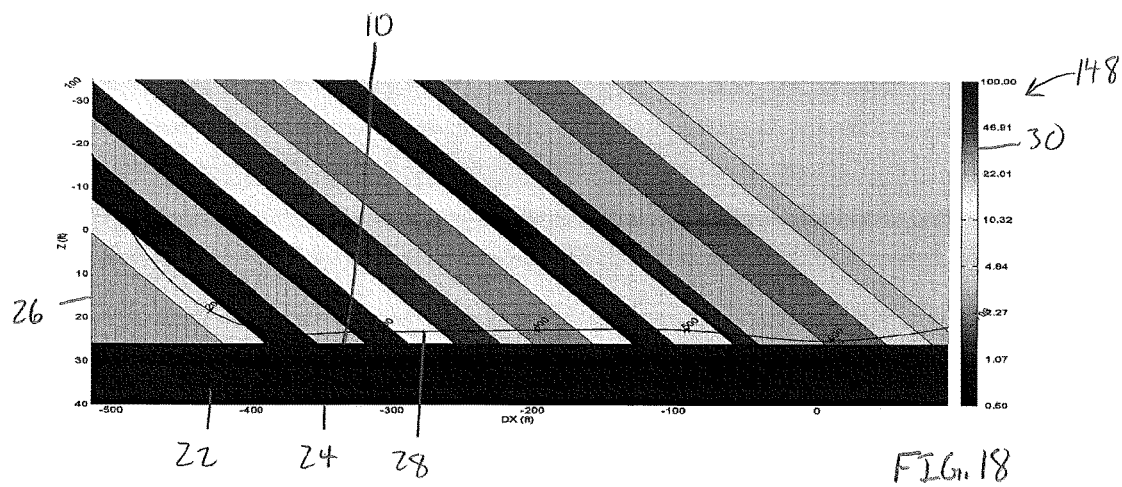
FIG. 18 is a graph of a synthetic formation representing a layered reservoir with an OWC, in accordance with an embodiment.

For the next scenario, FIG. 18 depicts a graph 148 in which the OWC 10 is moved closer to the wellbore 28 at a $TVD_{OWC}$ of approximately 26 feet. Since the OWC 10 is very close to the wellbore 28, all of the measurements, even the shallow ones are affected by OWC 10. In this scenario, may be beneficial to use the workflow 128 to achieve a better result for the reservoir resistivity and dip.

Figure 19:
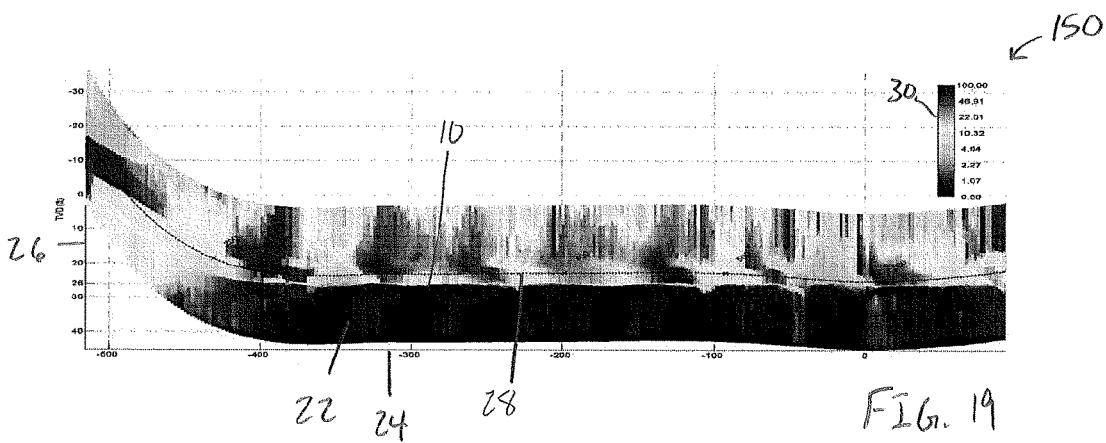
FIG. 19 is a graph of an inversion result using the workflow of FIG. 14 on the formation depicted in FIG. 18, in accordance with an embodiment.

FIG. 19 depicts a graph 150 of an inversion result using the workflow 128 on the formation depicted in FIG. 18. The workflow 128 estimated the OWC 10 (on average) at a $TVD_{OWC}$ of approximately 26.4 ft, which is close to the known level of 26 feet. However since the OWC 10 is very close to the trajectory the estimated dip for the internal layering has a reduced resolution. This reduced resolution of the estimated dip for the internal layering can be resolved by running a 2D inversion having the result of FIG. 19 as the initial model.

Sensitivity to Formation Layering Dip

The next scenarios depicted in FIGS. 20-23 are obtained by changing the layering dip 32 of the reservoir 12 from its original value (15°) to 10° and 20°. Both scenarios are similar to FIG. 2A except for the internal layering's dip. The OWC 10 and resistivity of the reservoir remain unchanged.

Figure 20:
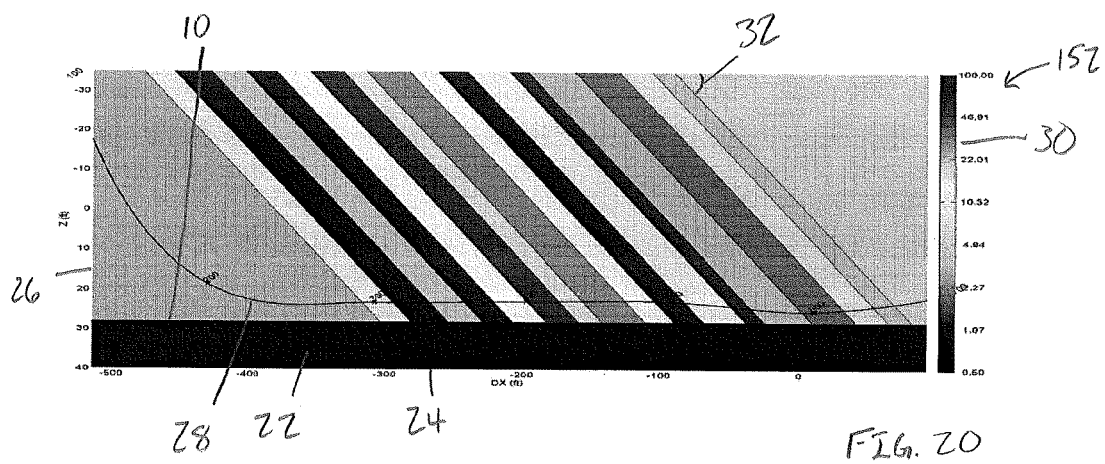
FIG. 20 is a graph of a synthetic formation representing a layered reservoir with an OWC, in accordance with an embodiment.
Figure 21:
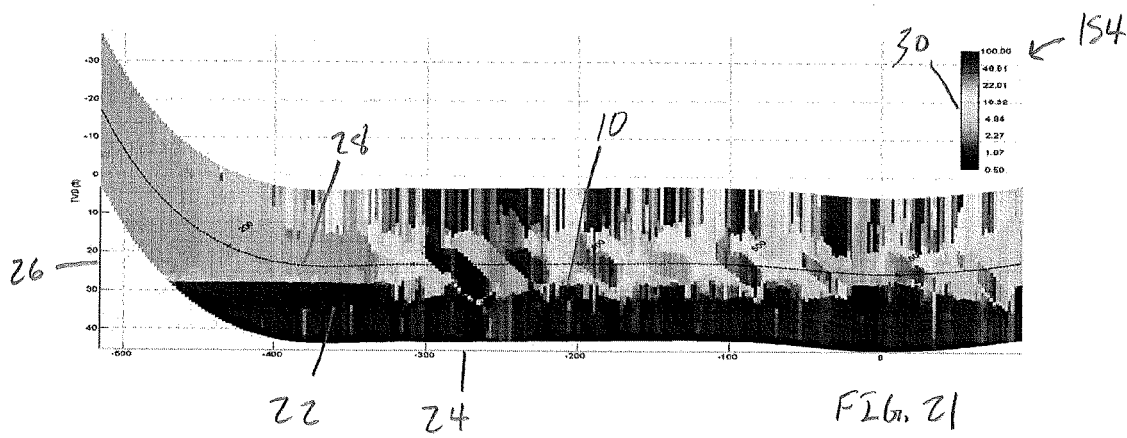
FIG. 21 is a graph of an inversion result using the workflow of FIG. 4 on the formation depicted in FIG. 20, in accordance with an embodiment.
Figure 22:
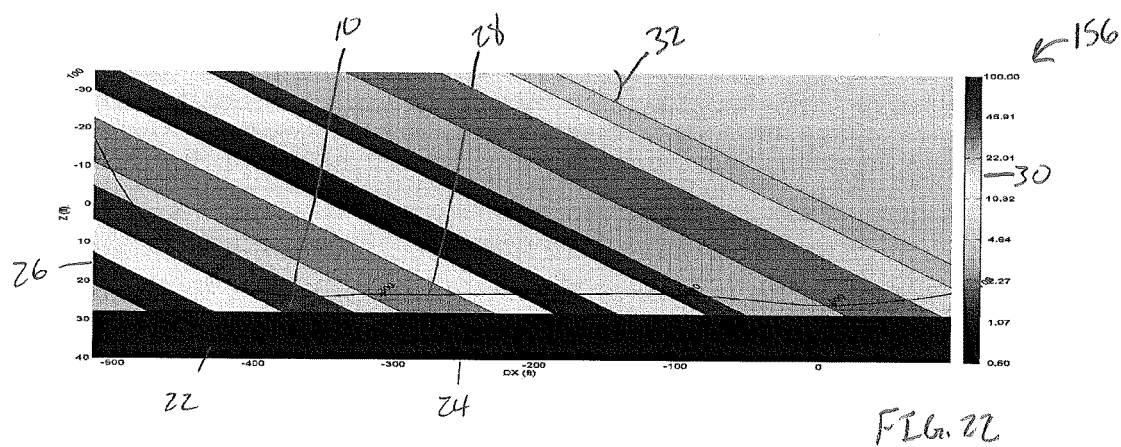
FIG. 22 is a graph of a synthetic formation representing a layered reservoir with an OWC, in accordance with an embodiment.
Figure 23:
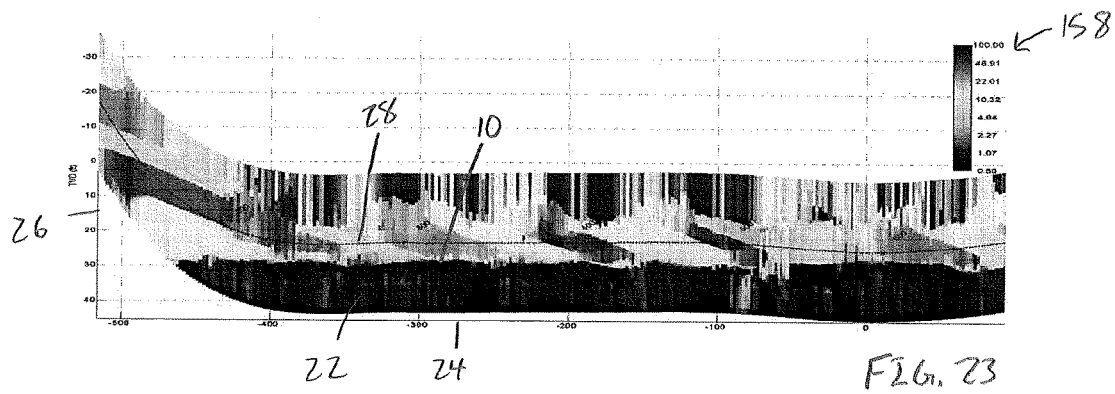
FIG. 23 is a graph of an inversion result using the workflow of FIG. 4 on the formation depicted in FIG. 22, in accordance with an embodiment.

In FIG. 20, a graph 152 depicts the formation dip 32 at 20°. Additionally, FIG. 21 provides a graph 154 of inversion results for a standard model-based inversion from the workflow 70 of the formation in FIG. 20. Further, FIG. 22 depicts a graph 156 with the formation dip 32 at 10°. Furthermore, FIG. 23 depicts a graph 158 of inversion results for a standard model-based inversion from the workflow 70 of the formation in FIG. 22.

Oklahoma Synthetic Formation with OWC

Figure 24:
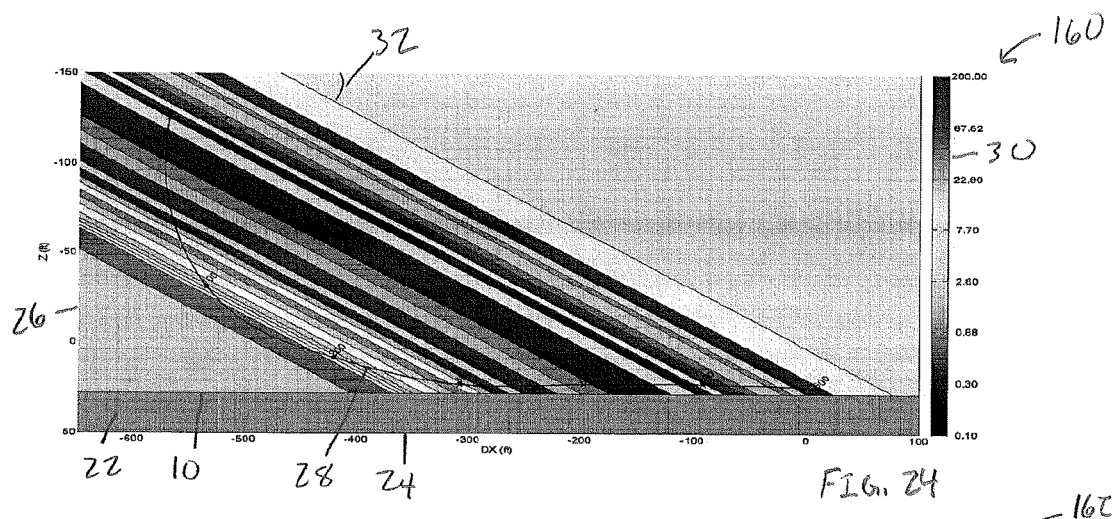
FIG. 24 is a graph of a synthetic Oklahoma formation representing a layered reservoir with an OWC, in accordance with an embodiment.
Figure 25A:
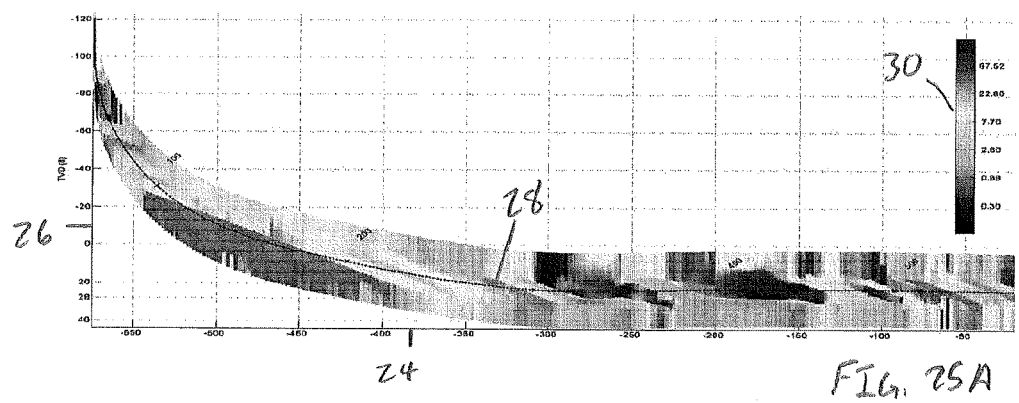
FIG. 25A is a graph of an inversion result using the workflow of FIG. 4 on the Oklahoma formation depicted in FIG. 24, in accordance with an embodiment.
Figure 25B:
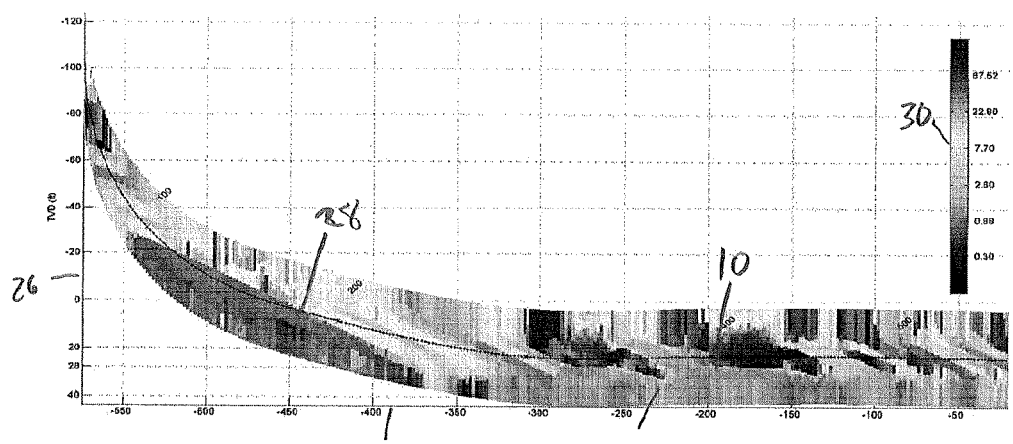
FIG. 25B is a graph of an inversion result using the workflow of FIG. 14 on the Oklahoma formation depicted in FIG. 24, in accordance with an embodiment.

The last synthetic example is depicted in FIG. 24 including a graph 160 representing a synthetic Oklahoma formation with the formation dip 32 at 18° and the OWC 10. Additionally, FIG. 25A depicts a graph 162 of inversion results for a standard model-based inversion from the workflow 70 of the synthetic Oklahoma formation. Further, FIG. 25B depicts a graph 164 of inversion results from the modified workflow 128. The result is a clear indication of the OWC 10 and the resistivity of the water zone 22. This may be a result of the wellbore 28 in FIG. 24 being in close proximity to the OWC 10, as discussed above.

This disclosure is directed to using a well placement application workflow that incorporates prior knowledge and assumes the OWC 10 below the wellbore 28. It also builds the model shallow-to-deep, and if needed, if formation layers are dipping, applies 2D inversion after initial the 1D model is built to map the OWC 10 more accurately.

Workflow 70:
1. Perform standard pixel-based or model-based 1D inversion.
2. Scan the resistivity profile and find the boundary position below the tool where $R<R_{wx}$ ($TVD_{OWCx}$).
3. Apply local residual weighted average on $TVD_{OWCx}$ to find the position of OWC ($TVD_{OWC}$).
4. Use $TVD_{OWC}$ as the initial guess and invert for water zone resistivity $R_w$ and OWC position $TVD_{OWC}$ (the internal layering remains unchanged).
5. Run a smoothing local post-processing operation to obtain the flat OWC and water zone resistivity.
6. 2D inversion: invert for layered model dip, position of OWC ($TVD_{OWC}$) and water zone resistivity, using the layered model from previous step.

Workflow 128:
1. Homogenous anisotropic medium inversion using resistivity channels (ARC).
2. Inversion of shallow directional and resistivity (2 layers with dip).
3. Inversion of shallow directional and resistivity (3 layers with dip).
4. Inversion of deep directional and resistivity for the OWC position and water zone resistivity using the information obtained from a standard 1D-inversion (internal layering resistivity and dip remain unchanged).
5. Perform 2D inversion for final model: invert for an internal dip, position of OWC ($TVD_{OWC}$), and water zone resistivity, using the layered model from previous step.

Above workflows 70 and 128 can be combined with the unconformity workflow, to invert for both unconformity and OWC.

Unconformity-OWC Workflow #1
1. Reconstruct the resistivity profile above the unconformity.
2. Perform standard pixel-based or model-based 1D inversion.
3. Scan the resistivity profile and find the boundary position below the tool where $R<R_{wx}$ ($TVD_{OWC}$).
4. Apply local residual weighted average on $TVD_{OWCx}$ to find the position of OWC ($TVD_{OWC}$).
5. Use $TVD_{OWC}$ as the initial guess and invert for water zone resistivity $R_w$ and OWC position $TVD_{OWC}$ and position of unconformity for a given resistivity profile from step 1 (the internal layering remains unchanged).
6. Run a smoothing local post-processing to obtain the flat OWC and water zone resistivity.
7. Run a smoothing local post-processing to obtain the consistent position of unconformity.
8. 2D inversion: invert for layered model, position of OWC ($TVD_{OWC}$) and water zone resistivity, and position of unconformity and internal dip, using the resistivity layered model from previous step.

Unconformity-OWC Workflow #2
1. Reconstruct the resistivity profile above the unconformity.

2. Homogenous anisotropic medium inversion using resistivity channels (ARC).
3. Inversion of shallow directional and resistivity (2 Layers with dip).
4. Inversion of shallow directional and resistivity (3 Layers with dip).
5. Inversion of deep directional and resistivity for OWC position and resistivity using the information obtained from a standard 1D-inversion (internal layering resistivity and dip remain unchanged).
6. Perform 2D inversion for final model: invert for internal dip, position of OWC ($TVD_{OWC}$), and water zone resistivity, using the layered model from previous step.
7. Run a smoothing local post-processing to obtain consistent position of unconformity.
8. 2D inversion: invert for layered model, position of OWC ($TVD_{OWC}$), and water zone resistivity, and position of unconformity and internal dip, using the resistivity layered model from previous step.

Some of the workflows and processes described herein, such as inversion, smoothing, and modeling processes, can be performed by a processing system. The work flows and processes can be performed at a variety of different locations. For example, in one embodiment, the processing system is located at a well site as part of surface equipment. The workflow and processing is performed entirely at the well site using the processing system. In another embodiment, the processing and workflow is performed entirely at a location that is remote from the well site. For example, surface equipment acquires formation data and transmits the formation data over a communications network (e.g., a computer network) to a processing system located at a remote location, such as an office building or a laboratory.

The term "processing system" should not be construed to limit the embodiments disclosed herein to any particular device type or system. In one embodiment, the processing system includes a computer system. The computer system may be a laptop computer, a desktop computer, or a mainframe computer. The computer system may include a graphical user interface (GUI) so that a user can interact with the computer system. The computer system may also include a computer processor (e.g., a microprocessor, microcontroller, digital signal processor, or general purpose computer) for executing any of the workflows and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, data from the wellbore tool.

Some of the workflows and processes can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Additionally or alternatively, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the workflows and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

The invention claimed is:

1. A method for determining a vertical depth of an oil-water contact in a subterranean formation, the method comprising:

drilling a wellbore above the oil-water contact in a subterranean formation, wherein the oil-water contact is a bounding surface in the subterranean formation between an upper oil zone and a lower water zone;

deploying the resistivity logging tool in the wellbore such that the oil-water contact is within a depth of investigation of the resistivity logging tool;

causing the resistivity logging tool to make resistivity measurements of the subterranean formation at a plurality of measured depths while deployed in the wellbore;

using a computer processor to sequentially execute the following processing steps:

(i) process a 1D inversion of the resistivity measurements made by the resistivity tool at one of the measured depths to generate an anisotropic resistivity profile of the subterranean formation;

(ii) scanning the anisotropic resistivity profile generated in (i) to obtain a vertical depth of a boundary located below the resistivity logging tool, wherein the vertical depth of the boundary is indicated by resistivity values less than a threshold value representing a maximum resistivity of the water zone;

(iii) repeating (i) and (ii) to obtain a plurality of vertical depths of the boundary located below the resistivity logging tool;

(iv) computing a local residual weighted average of the plurality of the vertical depths of the boundary to generate an initial estimation of the vertical depth of the oil-water contact;

(v) process a 1D inversion of the resistivity measurements using the initial estimation of the vertical depth of the oil-water contact generated in (iv) to compute a resistivity of the water zone and a modified vertical depth of the oil-water contact;

(vi) repeating (i)-(v) at a plurality of other ones of the measured depths in the wellbore to obtain a corresponding plurality of resistivity values of the water zone and modified vertical depths of the oil water contact;

(vii) smoothing the plurality of modified vertical depths of the oil water contact obtained in (vi) to compute the vertical depth of the oil water contact; and (viii) process a 2D inversion of the resistivity measurements made at the plurality of measured depths using the vertical depth of the oil water contact computed in (vii) and a two dimensional layered model.

2. The method of claim 1, wherein the 1D inversion comprises a pixel-based 1D inversion.

3. The method of claim 1, wherein the 1D inversion comprises a model-based 1D inversion.

4. The method of claim 3, wherein the model-based 1D inversion comprises up to 5 layers of refinement.

5. The method of claim 3, wherein the model-based 1D inversion comprises at least one layer of refinement, and wherein a total number of the layers of refinement is sufficient to detect a presence and a location of a water zone.

6. The method of claim 3, wherein the model-based 1D inversion comprises building model complexity from shallow measurements to deep measurements.

7. The method of claim 6, wherein the shallow measurements characterize a near zone of the resistivity logging tool to determine layering of the reservoir, and the deep measurements characterize the oil-water contact position.

8. The method of claim 1, wherein the layered model includes a flat oil-water contact representation and a uniform water zone resistivity.

* * * * *